United States Patent
Rofougaran

(10) Patent No.: US 7,787,852 B2
(45) Date of Patent: Aug. 31, 2010

(54) RF RECEIVER WITH HARMONIC BLOCKING IN LO

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 978 days.

(21) Appl. No.: 11/527,086

(22) Filed: Sep. 26, 2006

(65) Prior Publication Data

US 2008/0125058 A1    May 29, 2008

(51) Int. Cl.
*H04B 1/26* (2006.01)
*H04B 15/00* (2006.01)
*H04B 1/06* (2006.01)

(52) U.S. Cl. .......... 455/313; 455/323; 455/315; 455/316; 455/318; 455/255

(58) Field of Classification Search .......... 455/313, 455/315, 316, 318, 323, 208, 255, 258, 196.1, 455/147, 141, 86, 144, 341, 355, 253.2, 293
See application file for complete search history.

(56) References Cited

U.S. PATENT DOCUMENTS 7,142,818 B2 * 11/2006 Hunter et al. .............. 455/63.1
7,224,722 B2 *  5/2007 Shi et al. .................... 375/219

* cited by examiner

*Primary Examiner*—Eugene Yun
(74) *Attorney, Agent, or Firm*—Garlick Harrison & Markison

(57) ABSTRACT

A RF receiver includes a low noise amplifier and blocking module, a down conversion module, and a local oscillation module. The low noise amplifier and blocking module is coupled to receive an inbound RF signal, wherein the amplified inbound RF signal includes a desired RF signal component and a blocking RF signal component; attenuate the blocking RF signal component of the amplified inbound RF signal; and pass, substantially unattenuated and amplified, the desired RF signal component of the inbound RF signal to produce a desired inbound RF signal. The down conversion module is coupled to convert desired inbound RF signal into an inbound signal based on a receive local oscillation. The local oscillation module is coupled to produce the receive local oscillation, wherein the local oscillation module includes a notch filter module coupled to attenuate signal components of the receive local oscillation at frequencies corresponding to harmonics of the blocking RF signal component.

18 Claims, 9 Drawing Sheets

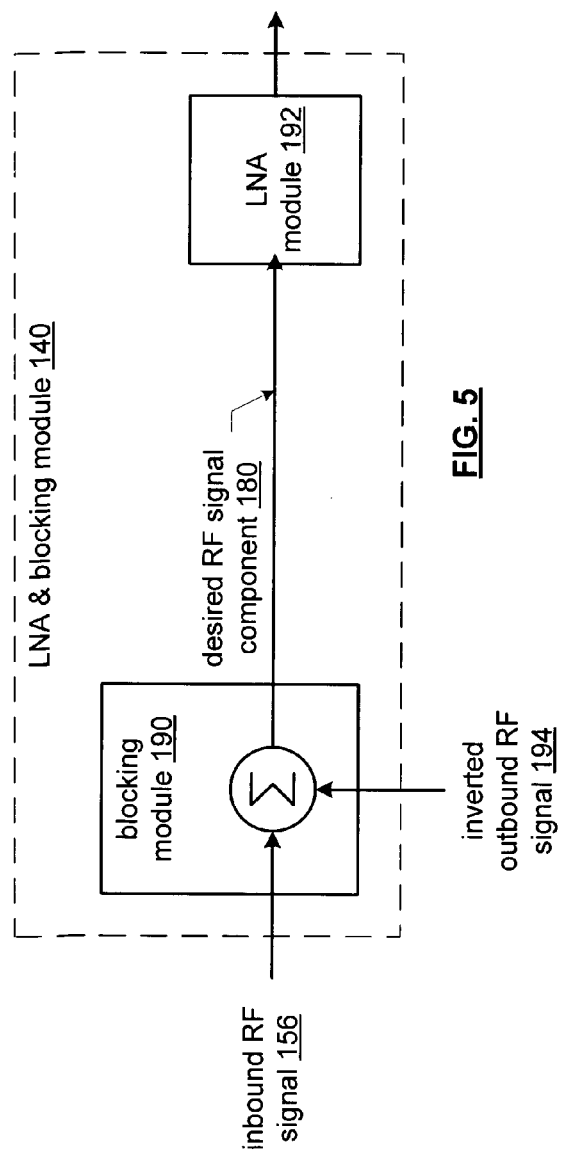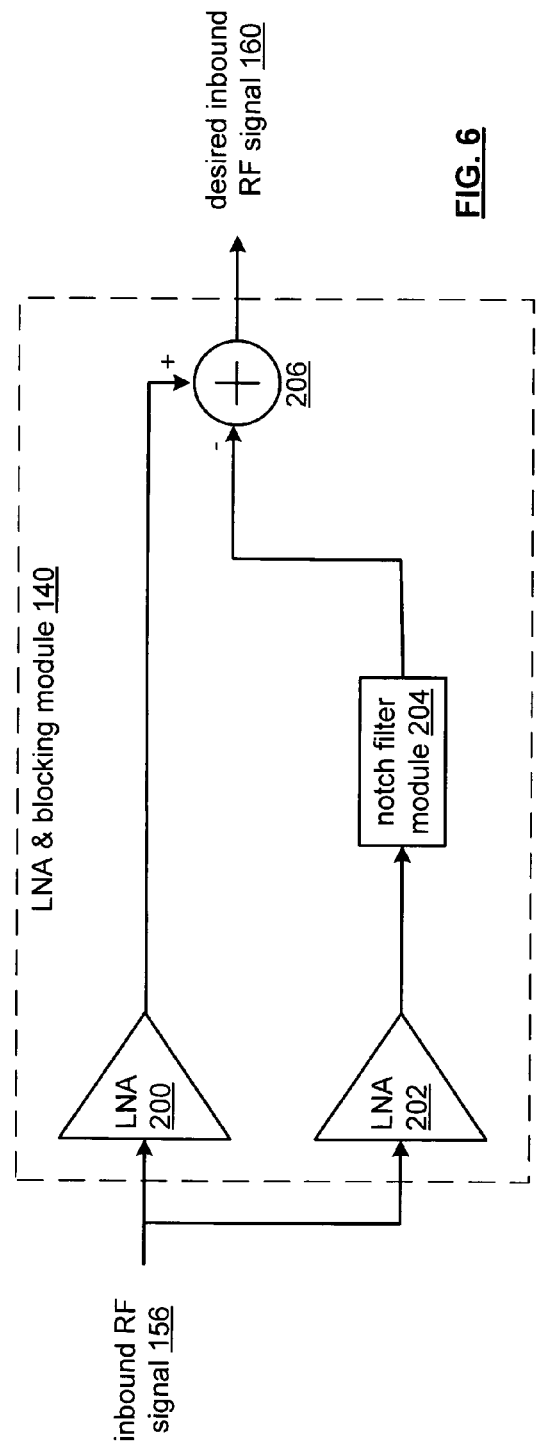

RF RECEIVER WITH HARMONIC BLOCKING IN LO

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communications systems and more particularly to radio receivers used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a receiver to reliably recover data from received inbound RF signals it must be able to isolate desired signal components of the inbound RF signals from interferers (e.g., interference from adjacent channel(s), interference from other devices and/or systems using frequencies near the frequency band of interest, and/or transmission blocking signals that occur in RFID systems). For example, in a cellular system, it is fairly common to have significant nearby interferers of the frequency band of interest (e.g., one or more desired channel(s) of 5-60 MHz centered at a frequency of about 900 MHz, 1800 MHz, 1900 MHz, and/or 2100 MHz) that adversely affect the ability of a receiver to accurately recover data.

One solution to reduce the adverse effects caused by interferers is to use an off-chip band pass filter (BPF) prior to the LNA to attenuate the interferers and pass the desired channel(s). However, with nearby interferers (e.g., within 100 MHz), the BPF needs a steep roll off to sufficiently attenuate the interferers making it an expensive part. In addition, an off-chip BPF typically reduces the magnitude of the desired channel(s) by about 3 dB. Another solution is to use a less expensive BPF with less roll off. While this reduces the cost and the attenuation of the desired channel(s), it does not sufficiently attenuate large nearby interferers.

A further issue with interferers is that their harmonics may also adversely affect the ability of a receiver to accurately recover data. For instance, while the receiver may adequately attenuate the interferer and pass the desired channel(s), the interferer harmonics may propagate through the receiver providing a high frequency noise that adversely affects high speed functions of the receiver (e.g., baseband operations, analog to digital conversion, etc.).

Therefore, a need exists for a radio receiver that sufficiently attenuates harmonics of interferers (which includes blocking signals) with negligible attenuation of the desired channel(s).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a schematic block diagram of an embodiment of a low noise amplifier (LNA) and blocking module in accordance with the present invention;

FIG. 6 is a schematic block diagram of another embodiment of a low noise amplifier (LNA) and blocking module in accordance with the present invention;

DETAILED DESCRIPTION OF THE INVENTION

Figure 1:
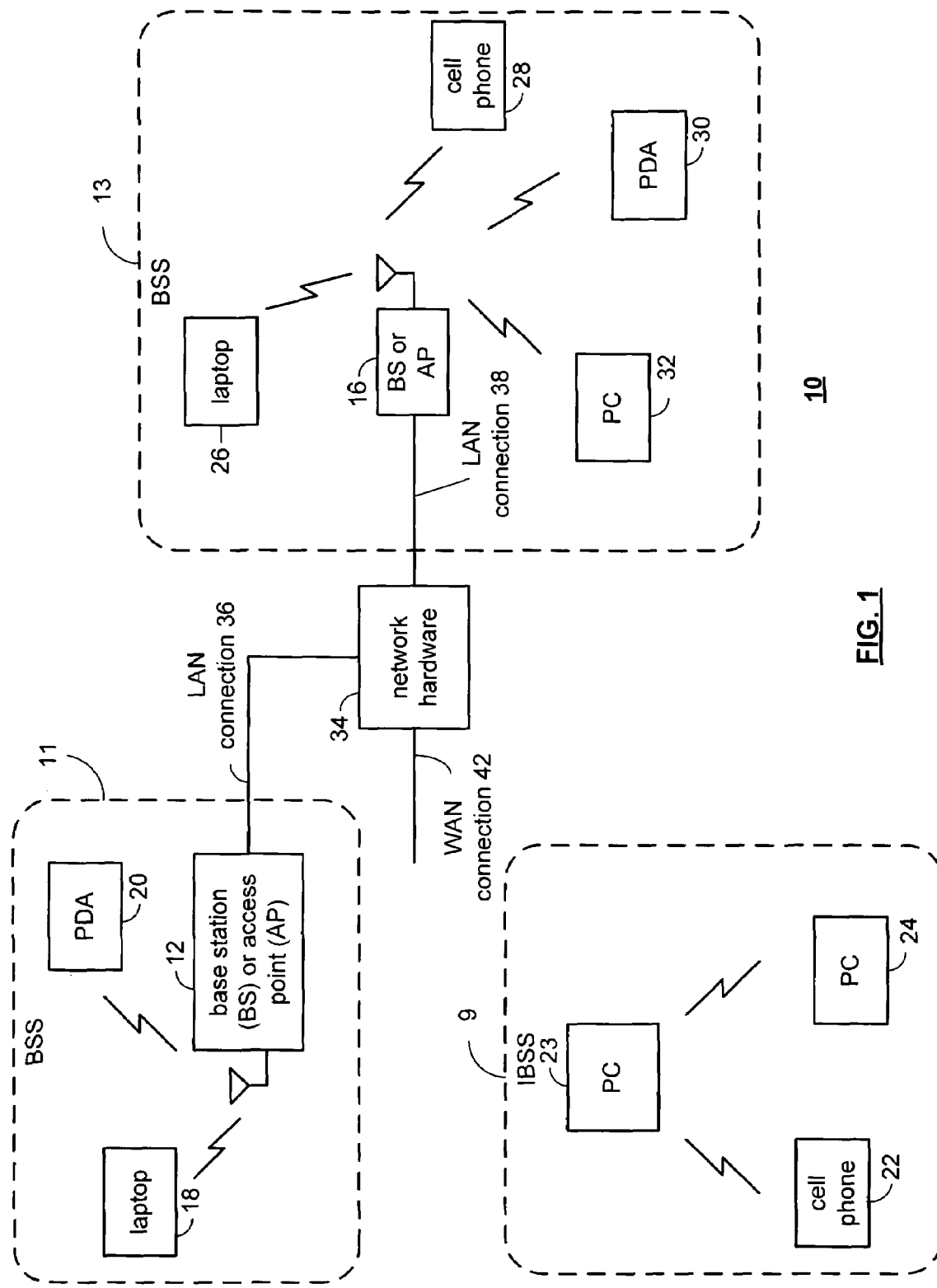
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless transceiver. The details of the wireless transceiver will be described in greater detail with reference to FIGS. 3-7.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
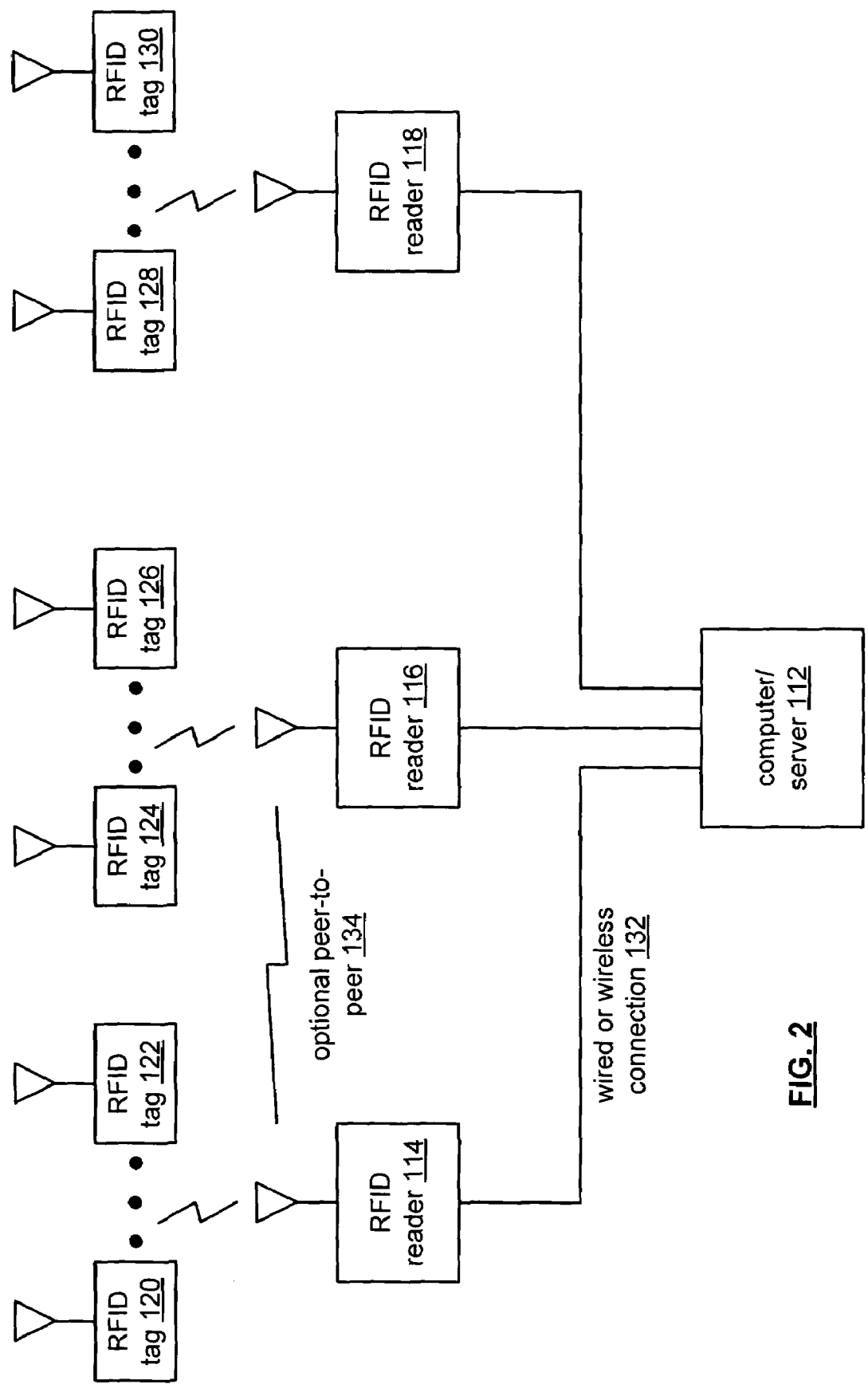
FIG. 2 is a schematic block diagram of a radio frequency identification (RFID) system in accordance with the present invention.

FIG. 2 is a schematic block diagram of an RFID (radio frequency identification) system that includes a computer/server 112, a plurality of RFID readers 114-118 and a plurality of RFID tags 120-130. The RFID tags 120-130 may each be associated with a particular object for a variety of purposes including, but not limited to, tracking inventory, tracking status, location determination, assembly progress, et cetera.

Each RFID reader 114-118 wirelessly communicates with one or more RFID tags 120-130 within its coverage area. For example, RFID reader 114 may have RFID tags 120 and 122 within its coverage area, while RFID reader 116 has RFID tags 124 and 126, and RFID reader 118 has RFID tags 128 and 130 within its coverage area. The RF communication scheme between the RFID readers 114-118 and RFID tags 120-130 may be a backscattering technique whereby the RFID readers 114-118 provide energy to the RFID tags via an RF signal. The RFID tags derive power from the RF signal and respond on the same RF carrier frequency with the requested data.

In this manner, the RFID readers 114-118 collect data as may be requested from the computer/server 112 from each of the RFID tags 120-130 within its coverage area. The collected data is then conveyed to computer/server 112 via the wired or wireless connection 132 and/or via the peer-to-peer communication 134. In addition, and/or in the alternative, the computer/server 112 may provide data to one or more of the RFID tags 120-130 via the associated RFID reader 114-118. Such downloaded information is application dependent and may vary greatly. Upon receiving the downloaded data, the RFID tag would store the data in a non-volatile memory.

As indicated above, the RFID readers 114-118 may optionally communicate on a peer-to-peer basis such that each RFID reader does not need a separate wired or wireless connection 132 to the computer/server 112. For example, RFID reader 114 and RFID reader 116 may communicate on a peer-to-peer basis utilizing a back scatter technique, a wireless LAN technique, and/or any other wireless communication technique. In this instance, RFID reader 116 may not include a wired or wireless connection 132 to computer/server 112. Communications between RFID reader 116 and computer/server 112 are conveyed through RFID reader 114 and the wired or wireless connection 132, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 2 may be expanded to include a multitude of RFID readers 114-118 distributed throughout a desired location (for example, a building, office site, et cetera) where the RFID tags may be associated with equipment, inventory, personnel, et cetera. Note that the computer/server 112 may be coupled to another server and/or network connection to provide wide area network coverage.

Figure 3:
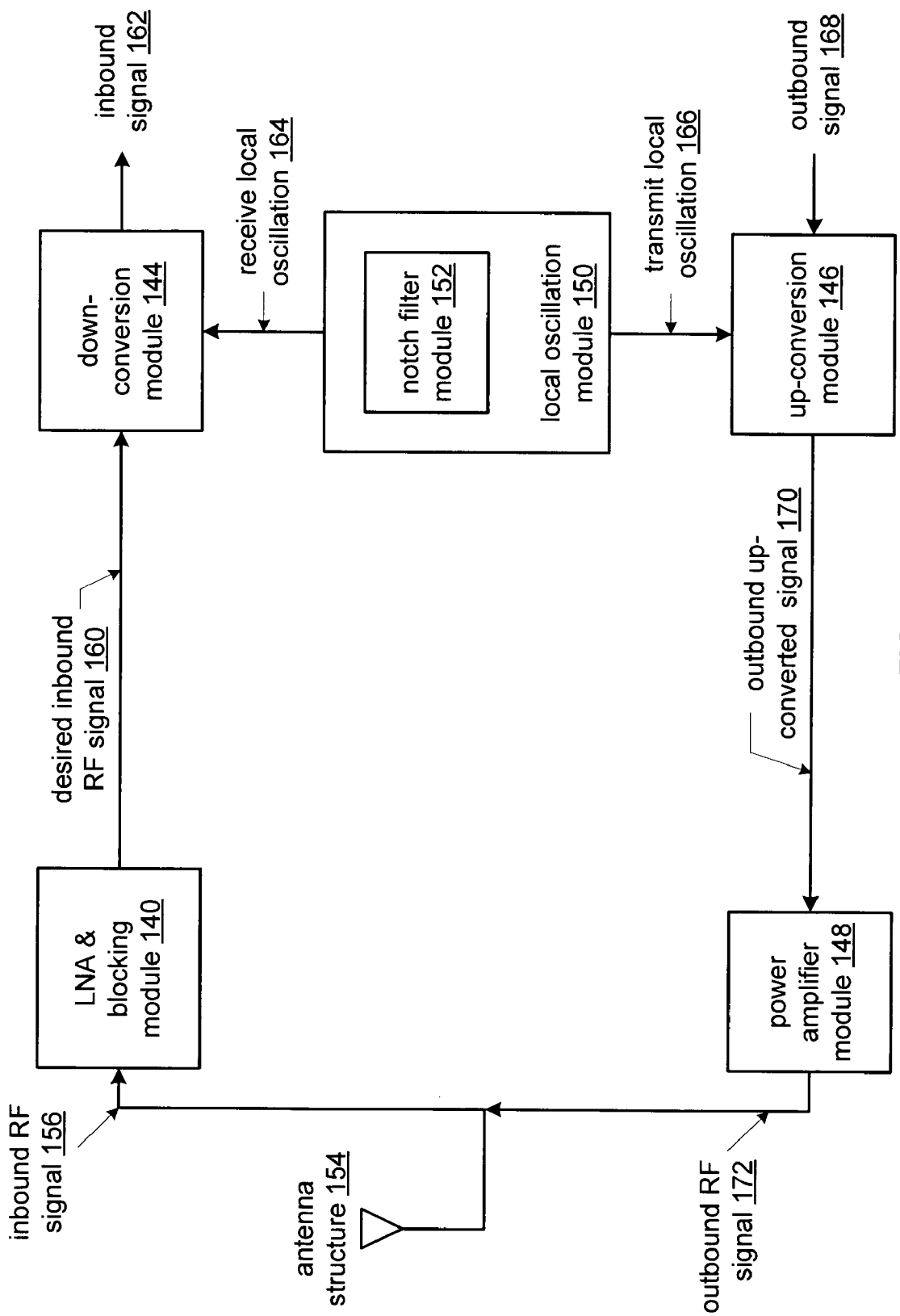
FIG. 3 is a schematic block diagram of a radio frequency (RF) transceiver in accordance with the present invention.

FIG. 3 is a schematic block diagram of a radio frequency (RF) transceiver that may provide the RF connectivity for the wireless communication devices 18-30 of FIG. 1, for the RFID readers 114-118 of FIG. 2, for the RFID tags 120-130 of FIG. 2, and/or for any other type of wireless device that transceives radio frequency signals. The RF transceiver includes a low noise amplifier (LNA) and blocking module 140, a down-conversion module 144, a local oscillation module 150, an up-conversion module 146, a power amplifier module 148, and an antenna structure 154. The antenna structure 154 may include one or more antennas of the same polarization, of different polarizations, of different frequency bands (e.g., a transmit frequency band and a receive frequency band), and/or of a diversity arrangement.

In operation, the low noise amplifier (LNA) and blocking module 140, which will be described in greater detail with reference to FIGS. 5 and 6, is coupled to receive an inbound RF signal 156, which includes a desired RF signal component and a blocking RF signal component. The blocking signal component corresponds to an outbound RF signal 172 and/or to a nearby interfering RF signal being received via the LNA and blocking module 140. The LNA and blocking module 140 filters and amplifies the inbound RF signal 156 by attenuating the blocking RF signal component of the amplified inbound RF signal and passing, substantially unattenuated and amplified, the desired RF signal component of the inbound RF signal to produce a desired inbound RF signal 160.

The down conversion module 144 is coupled to convert the desired inbound RF signal 160 into an inbound signal 162 based on a receive local oscillation 164. The down conversion module 144 may directly convert the desired inbound RF signal 160 into a baseband inbound signal 162 such that the receive local oscillation 164 has a frequency corresponding to the carrier frequency of the desired inbound RF signal 160. Alternatively, the down conversion module 144 may convert the desired inbound RF signal 160 into an intermediate frequency (IF) signal and then convert the intermediate frequency signal into the baseband inbound signal 162 such that the receive local oscillation 164 includes two local oscillations: one for the RF to IF conversion and a second for the IF to baseband conversion.

The down conversion module 144 may provide the inbound signal 162 to a receive baseband processing module for converting the inbound signal 162 into inbound data. The conversion process used by the receive baseband processing module is dependent upon the standard or standards to which the device is compliant. For example, for an IEEE 802.11 and/or Bluetooth compliant device, the receive baseband processing includes, but is not limited to, digital intermediate frequency to baseband conversion, demodulation, constellation demapping, decoding, and/or descrambling. As another example, for an RFID compliant device, the receive baseband processing includes pre-decoding and decoding such as EPC class 0 decoding, EPC class 1 decoding, EPC Class 1 Gen 2 decoding, ISO 18000-6 decoding, Manchester decoding, FM0 decoding, FM1 decoding, four-interval bit cell decoding, etc.

The local oscillation module 150, which will be described in greater detail with reference to FIGS. 7 and 8, includes a notch filter module 152. The local oscillation module is coupled to produce the receive local oscillation 164 and a transmit local oscillation 166. The notch filter module 162, which may be implemented as an inductor-capacitor tank circuit and/or a comb filter, is coupled to attenuate signal components of the receive local oscillation 164 at frequencies corresponding to harmonics of the blocking RF signal component. As such, when the receive local oscillation is mixed with the desired inbound RF signal 160, which includes the harmonics of the blocking RF signal component, the notch filter module 152 substantially attenuates the harmonics thereby reducing high frequency noise in the RF transceiver.

The up conversion module 146 is coupled to convert an outbound signal 168 into an outbound up converted signal 170 based on the transmit local oscillation 166. The outbound signal 168 may be received from a transmit baseband processing module that converted outbound data into the outbound signal 168. The conversion performed by the transmit baseband processing module is dependent upon the standard or standards to which the device is compliant. For example, for an IEEE 802.11 and/or Bluetooth compliant device, the conversions functions include, but are not limited to, scrambling, encoding, constellation mapping, modulation, and/or digital baseband to IF conversion. As another example, for RFID compliant devices, the transmit conversion function includes encoding, such as EPC class 0 encoding, EPC class 1 encoding, EPC Class 1 Gen 2 encoding, ISO 18000-6 encoding, Manchester encoding, FM1 encoding, FM1 encoding, four-interval bit cell encoding, etc.

The power amplifier module 148, which may include one or more amplifiers and/or pre-amplifiers coupled in series and/or in parallel, is coupled to amplify the up converted signal 170 to produce the outbound RF signal 172. As previously mentioned, the blocking RF signal component corresponds to the outbound RF signal.

Figure 4A:
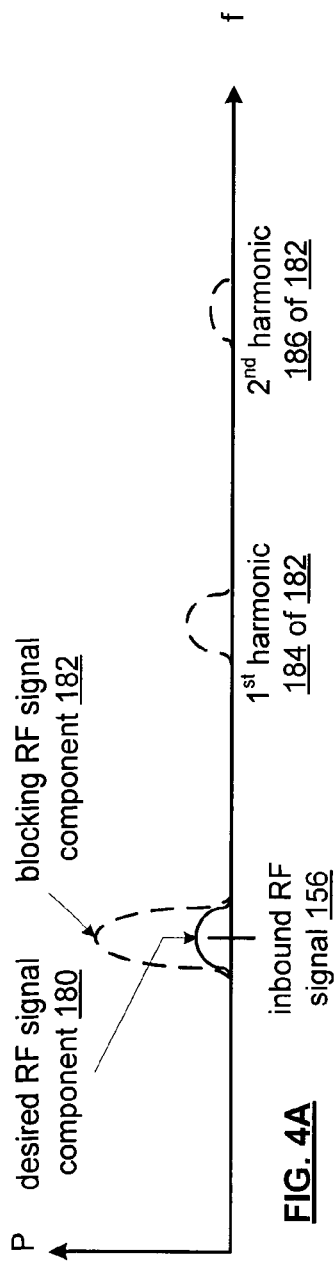
FIGS. 4A-4C are frequency domain diagrams of an inbound RF signal, a desired inbound RF signal, and a receive local oscillation (LO) in accordance with the present invention.
Figure 4B:
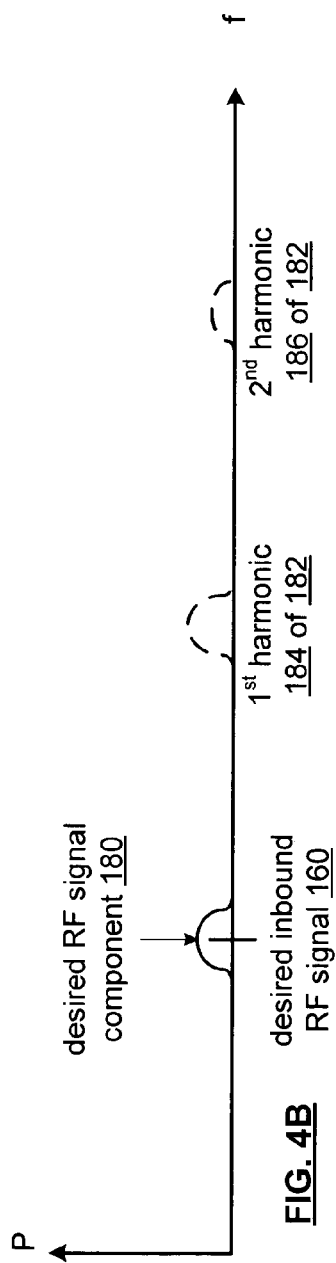
Figure 4C:
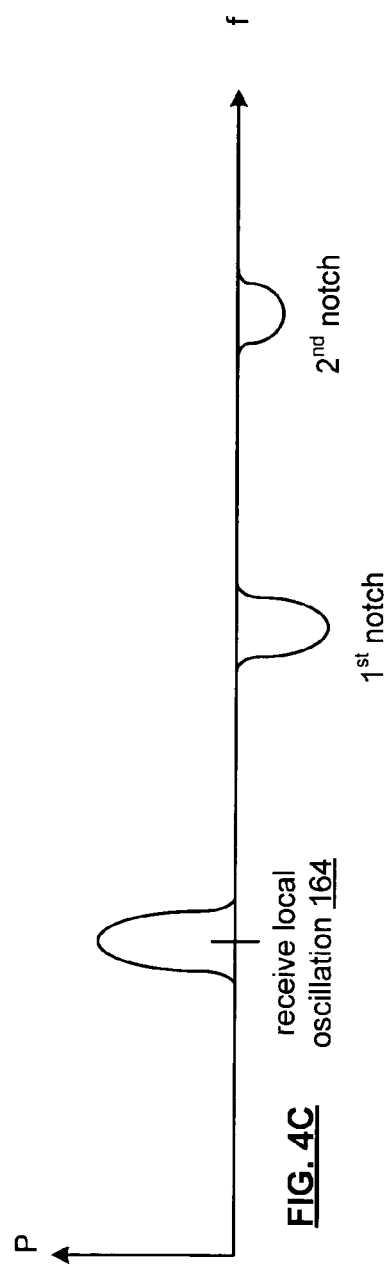

FIGS. 4A-4C are frequency domain diagrams of an inbound RF signal 156, a desired inbound RF signal 160, and a receive local oscillation (LO) 164. In figure FIG. 4A, the inbound RF signal 156 is shown to include a desired RF signal component 180 and a blocking RF signal component 182. The blocking RF signal component 182 may result from the transmitter portion of the RF transceiver using the same, or nearly the same, carrier frequency for outbound RF signals as the carrier frequency of the inbound RF signal 156. Alternatively, the blocking RF signal component 182 may result from a nearby interfering RF signal. In either case, the blocking RF signal component 182 includes harmonics of which the $1^{st}$ harmonic 184 and the $2^{nd}$ harmonic 186 is shown.

FIG. 4B illustrates the output of the LNA and blocking module 140, which includes the desired inbound RF signal 160 and the harmonics 184 and 186 of the blocking RF signal component 182. FIG. 4C illustrates the receive local oscillation 164 and the notch filtering characteristics of the notch filter 152. For a direct conversion receiver, the fundamental frequency of the receive local oscillation 164 is at about the same frequency as the carrier frequency of the inbound RF signal. The notch filter 152 provides notches at frequencies corresponding to the harmonics of the blocking RF signal 182.

The down conversion module 144 mixes the signal of FIG. 4B with the signal and filter response of FIG. 4C to produce the inbound signal 162. As such, when the two signals are mixed, the fundamental frequency of the receive local oscillation 164 is multiplied with the desired inbound RF signal 160 and the notch filtering response attenuates the harmonics 182 and 184 of the blocking RF signal component 182 such that the high frequency noise caused by the harmonics 182 and 184 is substantially attenuated.

FIG. 5 is a schematic block diagram of an embodiment of a low noise amplifier (LNA) and blocking module 140 that includes a blocking module 190 and a LNA module 192. The blocking module 190 may include a summation module that sums the inbound RF signal 156, which includes the desired RF signal component 180 and the blocking RF signal component 182, with an inversion of the outbound RF signal 194. Since a primary source of the blocking RF signal component 182 is the outbound RF signal, then summing an inversion of the outbound RF signal 194 with the inbound RF signal 156 substantially removes the blocking signal component 182 from the inbound RF signal 156, thus leaving the desired RF signal component 180.

The LNA module 192, which may include one or more low noise amplifiers coupled in series and/or in parallel, amplifies the desired RF signal component 180 to produce the desired inbound RF signal 160. The LNA module 192 amplifies the desired RF signal component 180 in accordance with a gain setting that may be received by the LNA module 192 from another module (e.g., the receive and/or transmit baseband processing module) or it may generate the gain setting via an automatic gain controller within the LNA module 192.

FIG. 6 is a schematic block diagram of another embodiment of a low noise amplifier (LNA) and blocking module 140 that includes a $1^{st}$ LNA 200, a $2^{nd}$ LNA 202, a notch filter module 204, and a subtraction module 206. In this embodiment, the transmit path and receiver path of the RF transceiver use different frequencies, such that the blocking signal produced by the outbound RF signal is at a different carrier frequency than the carrier frequency of the inbound RF signal (e.g., inbound RF signal may have a carrier frequency in the range of 890-915 MHz or 1920-1980 MHz and the outbound RF signal may have a carrier frequency in the range of 935-960 MHz or 2110-2170 MHz). As such, the blocking signal is offset in frequency from the desired signal component of the inbound RF signal.

In this embodiment, the $1^{st}$ and $2^{nd}$ LNAs 200 and 202 amplify the inbound RF signal 156, which includes the desired RF signal component 180 and the blocking RF signal component 182. The notch filter module 204, which may be an inductive-capacitive tank circuit or a comb filter, has a filtering notch centered at the carrier frequency of the desired RF signal component 180 such that the output of the notch filter module 204 is substantially the blocking RF signal component 182. The subtraction module 206 subtracts the output of LNA 202 (i.e., amplified blocking RF signal component 182) from the output of LNA 200 (i.e., amplified inbound RF signal) to produce an amplified desired inbound RF signal 160.

Figure 7:
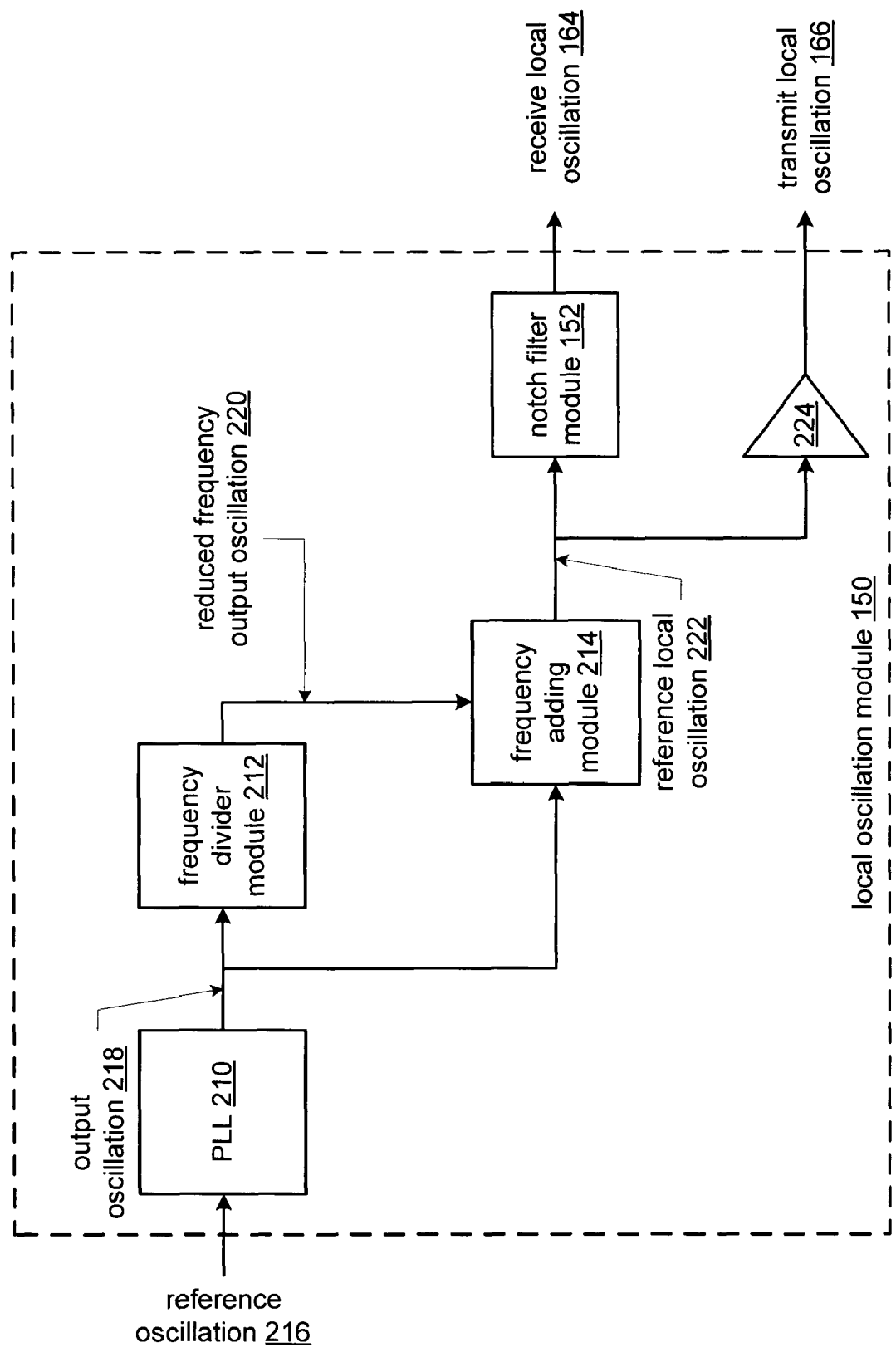
FIG. 7 is a schematic block diagram of an embodiment of a local oscillation module in accordance with the present invention.

FIG. 7 is a schematic block diagram of an embodiment of a local oscillation module 150 that includes a phase locked loop (PLL) 210, a frequency divider module 212, a frequency adding module 214, the notch filter module 152, and a buffer 224. The phase locked loop 210 is coupled to produce an output oscillation 218 from a reference oscillation 216 and a feedback representation of the output oscillation 218. The frequency divider module 212 is coupled to divide the frequency of the output oscillation 212 to produce a reduced frequency output oscillation 220. The frequency adding module 214 is coupled to add the output oscillation 218 with the reduced frequency output oscillation 220 to produce a reference local oscillation 222. For example, if the output oscillation has a frequency of 1600 MHz and the frequency divider module 212 is a divide-by-2 module, then the reduced frequency output oscillation 220 has a frequency of 800 MHz. When the two oscillations are added, the resulting reference local oscillation 222 has a frequency of 2400 MHz.

The notch filter module 152 filters the reference local oscillation 222 to produce the receive local oscillation 164. In one embodiment, the notch filter module 152 includes an inductive-capacitive tank circuit tuned to a first harmonic of the blocking RF signal component. In an extended embodiment, the notch filter module includes a second inductive-capacitive tank circuit tuned to a second harmonic of the blocking RF signal component. In another embodiment, the notch filter module includes a comb filter having nulls corresponding to the harmonics of the blocking RF signal component.

The buffer 224 buffers the reference local oscillation 222 to produce the transmit local oscillation 166 when the transmit path and receive path use the same carrier frequency (i.e., the inbound RF signal and the outbound RF signal has substantially the same carrier frequency). In another embodiment, a frequency adjust module is coupled to the buffer 224, wherein the frequency adjust module adjusts the frequency of the reference local oscillation 222 to produce a desired frequency for the transmit local oscillation 166. In this latter embodiment, the transmit path and receive path are using different carrier frequencies.

Figure 8:
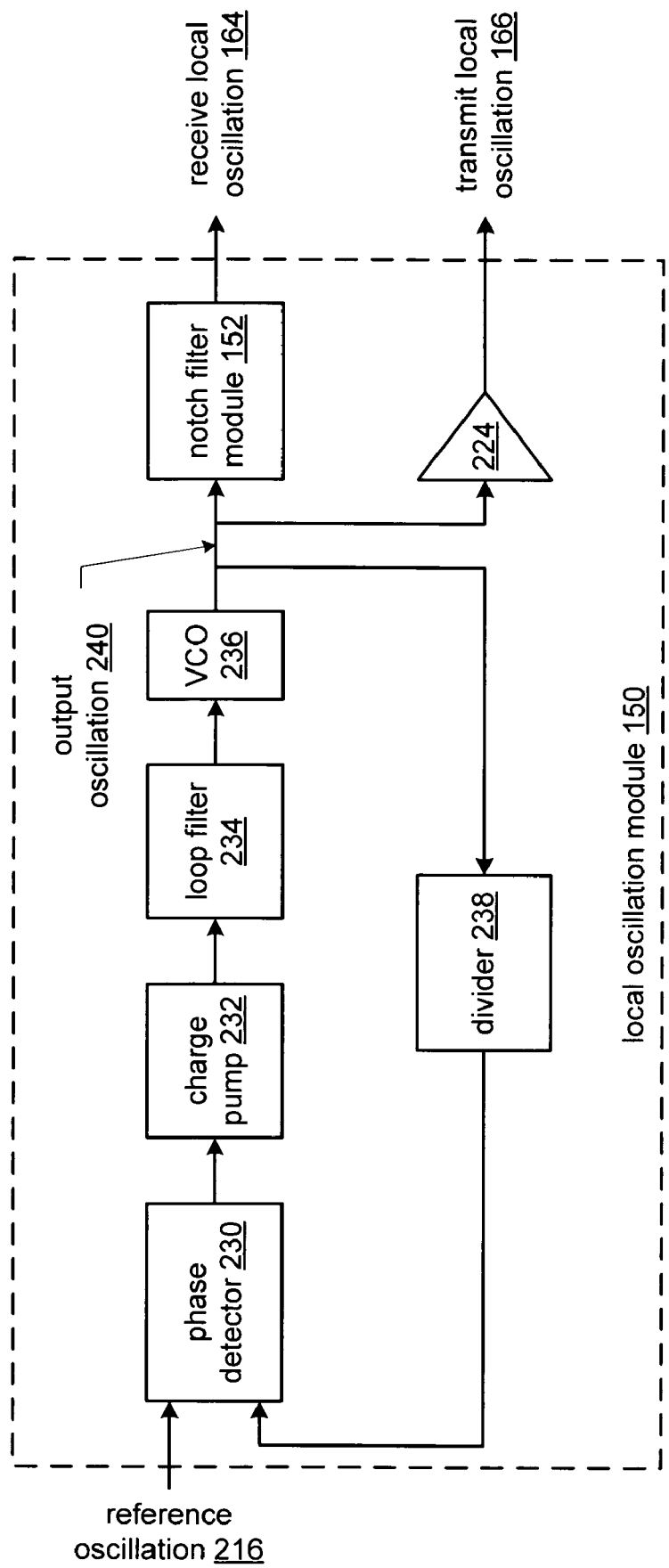
FIG. 8 is a schematic block diagram of another embodiment of a local oscillation module in accordance with the present invention.

FIG. 8 is a schematic block diagram of another embodiment of a local oscillation module 150 that include a phase detector 230, a charge pump 232, a loop filter 234, a voltage controlled oscillator 236, a divider 238, the notch filter module 152, and the buffer 224. In this embodiment, the phase detector 230 is coupled to produce a difference signal based a phase difference between a reference oscillation 216 and a feedback oscillation. The charge pump 232 is coupled to produce an unfiltered control voltage based on the difference signal. The loop filter 234 is coupled to filter the unfiltered control voltage to produce a control voltage. The voltage controlled oscillator (VCO) 236 is coupled to produce an output oscillation 240 based on the control voltage. The divider is coupled to produce the feedback oscillation from the output oscillation 240 based on a divider value.

The notch filter module 152 is coupled to filter the output oscillation 240 to produce the receive local oscillation 164. In addition, a buffer 224 buffers the output oscillation 240 to produce the transmit local oscillation 166.

Figure 9:
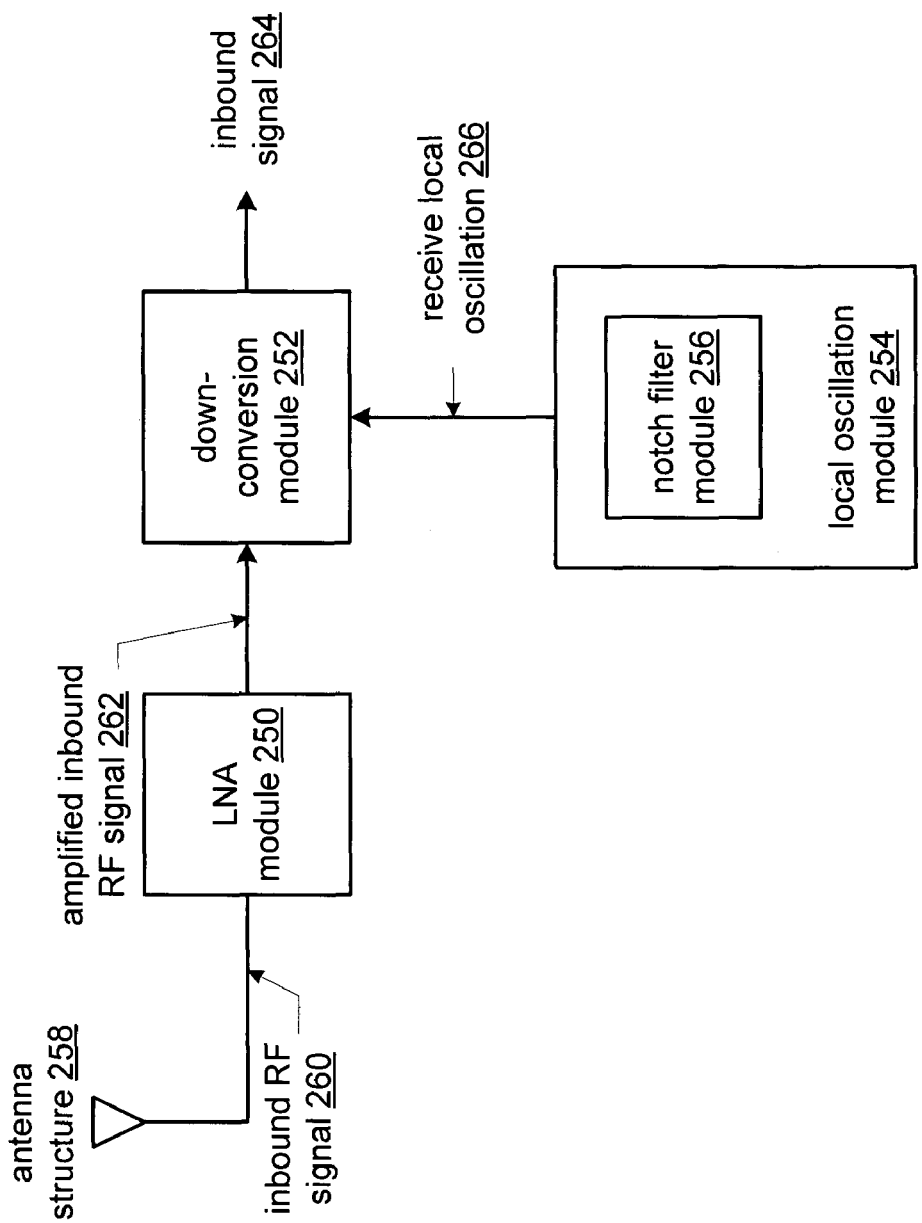
FIG. 9 is a schematic block diagram of an RF receiver in accordance with the present invention.

FIG. 9 is a schematic block diagram of an RF receiver that includes an LNA module 250, a down-conversion module 252, a local oscillation module 254, and an antenna structure 258. The antenna structure 258 may include one or more antennas of the same polarization, of different polarizations, of different frequency bands (e.g., a transmit frequency band and a receive frequency band), and/or of a diversity arrangement.

In operation, the low noise amplifier module 250, which may include one or more amplifiers, amplifies an inbound RF signal 260 to produce an amplified inbound RF signal 262. Note that the amplified inbound RF signal includes a desired RF signal component and an interfering RF signal component. The down conversion module 252 is coupled to convert the inbound RF signal 262 into an inbound signal 264 based on a receive local oscillation 266. The local oscillation module 254 includes a notch filter module 256 and is coupled to produce the receive local oscillation 266. The notch filter module 256 is coupled to attenuate signal components of the receive local oscillation 266 at frequencies corresponding to the interfering RF signal component. Note that the local oscillation module 254 may be implemented as shown in FIG. 7 or 8, less the buffer 224.

Figure 10A:
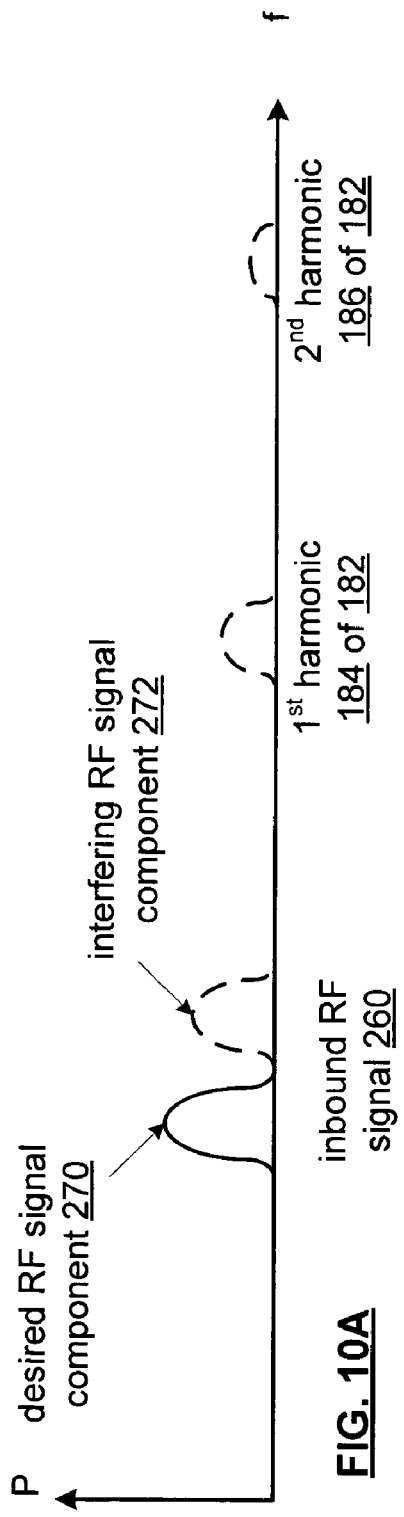
FIGS. 10A and 10B are frequency domain diagrams of an inbound RF signal, an interfering RF signal component, and a receive local oscillation (LO) in accordance with the present invention.
Figure 10B:
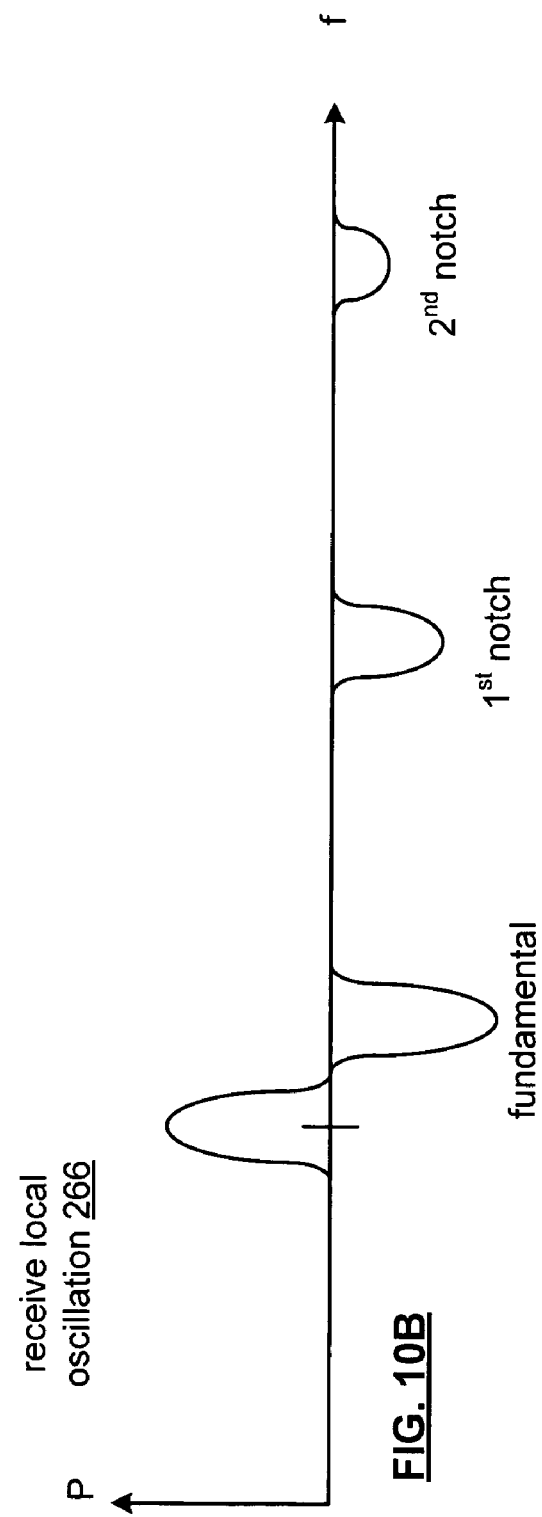

FIGS. 10A and 10B are frequency domain diagrams of an inbound RF signal 260, an interfering RF signal component 272, and a receive local oscillation (LO) 266. In FIG. 10A, the inbound RF signal 260 is shown to include a desired RF signal component 270 and the interfering RF signal component 272. The interfering RF signal component 272 may result from the transmitter portion of the RF transceiver using the slightly different carrier frequency (e.g., in the range of 890-915 MHz or 1920-1980 MHz) for outbound RF signals as the carrier frequency (e.g., in the range of 935-960 MHz or 2110-2170 MHz) of the inbound RF signal 260. Alternatively, the interfering RF signal component 272 may result from a nearby interfering RF signal. In either case, the interfering RF signal component 272 includes harmonics of which the $1^{st}$ harmonic 184 and the $2^{nd}$ harmonic 186 is shown.

FIG. 10B illustrates the receive local oscillation 266 and the notch filtering characteristics of the notch filter 152. For a direct conversion receiver, the fundamental frequency of the receive local oscillation 266 is at about the same frequency as the carrier frequency of the inbound. RF signal. The notch filter 152 provides notches at frequencies corresponding to the fundamental frequency of the interfering RF signal component 272 and at the harmonics of the interfering RF signal 272.

The down conversion module 144 mixes the signal of FIG. 10A with the signal and filter response of FIG. 10B to produce the inbound signal 264. As such, when the two signals are mixed, the fundamental frequency of the receive local oscillation 266 is multiplied with the desired inbound RF signal 262 and the notch filtering response attenuates the fundamental frequency and harmonics 182 and 184 of the interfering RF signal component 272 such that the high frequency noise caused by the harmonics 182 and 184 is substantially attenuated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transceiver comprises:
   a low noise amplifier and blocking module coupled to:
   receive an inbound RF signal, wherein the inbound RF signal includes a desired RF signal component and a blocking RF signal component;
   attenuate the blocking RF signal component of the amplified inbound RF signal; and
   pass, substantially unattenuated and amplified, the desired RF signal component of the inbound RF signal to produce a desired inbound RF signal;
   a down conversion module coupled to convert the desired inbound RF signal into an inbound signal based on a receive local oscillation;
   an up conversion module coupled to convert an outbound signal into an outbound up converted signal based on a transmit local oscillation;
   a power amplifier module coupled to amplify the up converted signal to produce an outbound RF signal, wherein the blocking RF signal component corresponds to the outbound RF signal; and
   a local oscillation module coupled to produce the receive local oscillation and the transmit local oscillation, wherein the local oscillation module includes a notch filter module coupled to attenuate signal components of the receive local oscillation at frequencies corresponding to harmonics of the blocking RF signal component, in which the notch filter module performs harmonic attenuation on the receive local oscillation prior to coupling the receive local oscillation to the down conversion module.

2. The RF transceiver of claim 1, wherein the local oscillation module comprises:
   a phase locked loop coupled to produce an output oscillation based on a reference oscillation;
   a frequency divider module coupled to divide frequency of the output oscillation to produce a reduced frequency output oscillation; and
   a frequency adding module coupled to add the output oscillation with the reduced frequency output oscillation to produce a reference local oscillation, wherein the notch filter module filters the reference local oscillation to produce the receive local oscillation and wherein the transmit local oscillation is derived from the reference local oscillation.

3. The RF transceiver of claim 1, wherein the local oscillation module comprises:
a phase detector coupled to produce a difference signal based a phase difference a reference oscillation and a feedback oscillation;
a charge pump coupled to produce an unfiltered control voltage based on the difference signal;
a loop filter coupled to filter the unfiltered control voltage to produce a control voltage;
a voltage controlled oscillator coupled to produce an output oscillation based on the control voltage; and
a divider coupled to produce the feedback oscillation from the output oscillation based on a divider value, wherein the notch filter module is coupled to filter the output oscillation.

4. The RF transceiver of claim 1, wherein the notch filter module comprises:
an inductive-capacitive tank circuit tuned to a first harmonic of the blocking RF signal component.

5. The RF transceiver of claim 4, wherein the notch filter module comprises:
a second inductive-capacitive tank circuit tuned to a second harmonic of the blocking RF signal component.

6. The RF transceiver of claim 1, wherein the notch filter module comprises:
a comb filter having nulls corresponding to the harmonics of the blocking RF signal component.

7. A radio frequency (RF) receiver comprises:
a low noise amplifier and blocking module coupled to:
receive an inbound RF signal, wherein the inbound RF signal includes a desired RF signal component and a blocking RF signal component;
attenuate the blocking RF signal component of the amplified inbound RF signal; and
pass, substantially unattenuated and amplified, the desired RF signal component of the inbound RF signal to produce a desired inbound RF signal;
a down conversion module coupled to convert the desired inbound RF signal into an inbound signal based on a receive local oscillation; and
a local oscillation module coupled to produce the receive local oscillation, wherein the local oscillation module includes a notch filter module coupled to attenuate signal components of the receive local oscillation at frequencies corresponding to harmonics of the blocking RF signal component, in which the notch filter module performs harmonic attenuation on the receive local oscillation prior to coupling the receive local oscillation to the down conversion module.

8. The RF receiver of claim 7, wherein the local oscillation module comprises:
a phase locked loop coupled to produce an output oscillation based on a reference oscillation;
a frequency divider module coupled to divide frequency of the output oscillation to produce a reduced frequency output oscillation; and
a frequency adding module coupled to add the output oscillation with the reduced frequency output oscillation to produce a reference local oscillation, wherein the notch filter module filters the reference local oscillation to produce the receive local oscillation.

9. The RF receiver of claim 7, wherein the local oscillation module comprises:
a phase detector coupled to produce a difference signal based a phase difference a reference oscillation and a feedback oscillation;
a charge pump coupled to produce an unfiltered control voltage based on the difference signal;
a loop filter coupled to filter the unfiltered control voltage to produce a control voltage;
a voltage controlled oscillator coupled to produce an output oscillation based on the control voltage; and
a divider coupled to produce the feedback oscillation from the output oscillation based on a divider value, wherein the notch filter module is coupled to filter the output oscillation.

10. The RF receiver of claim 7, wherein the notch filter module comprises:
an inductive-capacitive tank circuit tuned to a first harmonic of the blocking RF signal component.

11. The RF receiver of claim 10, wherein the notch filter module comprises:
a second inductive-capacitive tank circuit tuned to a second harmonic of the blocking RF signal component.

12. The RF receiver of claim 7, wherein the notch filter module comprises:
a comb filter having nulls corresponding to the harmonics of the blocking RF signal component.

13. A radio frequency (RF) receiver comprises:
a low noise amplifier module coupled to amplify an inbound RF signal to produce an amplified inbound RF signal, wherein the amplified inbound RF signal includes a desired RF signal component and an interfering RF signal component;
a down conversion module coupled to convert the inbound RF signal into an inbound signal based on a receive local oscillation; and
a local oscillation module coupled to produce the receive local oscillation, wherein the local oscillation module includes a notch filter module coupled to attenuate signal components of the receive local oscillation at frequencies corresponding to the interfering RF signal component, in which the notch filter module performs select frequency attenuation on the receive local oscillation prior to coupling the receive local oscillation to the down conversion module.

14. The RF receiver of claim 13, wherein the local oscillation module comprises:
a phase locked loop coupled to produce an output oscillation based on a reference oscillation;
a frequency divider module coupled to divide frequency of the output oscillation to produce a reduced frequency output oscillation; and
a frequency adding module coupled to add the output oscillation with the reduced frequency output oscillation to produce a reference local oscillation, wherein the notch filter module filters the reference local oscillation to produce the receive local oscillation.

15. The RF receiver of claim 13, wherein the local oscillation module comprises:
a phase detector coupled to produce a difference signal based a phase difference a reference oscillation and a feedback oscillation;
a charge pump coupled to produce an unfiltered control voltage based on the difference signal;
a loop filter coupled to filter the unfiltered control voltage to produce a control voltage;

a voltage controlled oscillator coupled to produce an output oscillation based on the control voltage; and a divider coupled to produce the feedback oscillation from the output oscillation based on a divider value, wherein the notch filter module is coupled to filter the output oscillation.

16. The RF receiver of claim 13, wherein the notch filter module comprises:

an inductive-capacitive tank circuit tuned to a fundamental frequency of the interfering RF signal component.

17. The RF receiver of claim 16, wherein the notch filter module comprises:

a second inductive-capacitive tank circuit tuned to a harmonic of the interfering RF signal component.

18. The RF receiver of claim 13, wherein the notch filter module comprises:

a comb filter having nulls corresponding to a fundamental frequency and harmonics of the interfering RF signal component.

* * * * *

UNITED STATES PATENT AND TRADEMARK OFFICE
CERTIFICATE OF CORRECTION

| | | |
|---|---|---|
| PATENT NO. | : 7,787,852 B2 | Page 1 of 1 |
| APPLICATION NO. | : 11/527086 | |
| DATED | : August 31, 2010 | |
| INVENTOR(S) | : Ahmadreza Rofougaran | |

It is certified that error appears in the above-identified patent and that said Letters Patent is hereby corrected as shown below:

Col. 11, line 7, in Claim 3: after "based", insert --on-- and after "a phase difference", insert --of--
Col. 12, line 4, in Claim 9: after "based", insert --on-- and after "a phase difference", insert --of--
Col. 12, line 62, in Claim 15: after "based", insert --on-- and after "a phase difference", insert --of--

Signed and Sealed this
Eighth Day of May, 2012

David J. Kappos
*Director of the United States Patent and Trademark Office*